United States Patent
Kamata et al.

(10) Patent No.: US 9,287,762 B2
(45) Date of Patent: Mar. 15, 2016

(54) HIGH-VOLTAGE INVERTER, DIELECTRIC-BARRIER DISCHARGE EVICE AND CATION APPARATUS

(71) Applicants: Hisahiro Kamata, Kanagawa (JP); Eiki Hirama, Miyagi (JP); Masahiro Noguchi, Miyagi (JP)

(72) Inventors: Hisahiro Kamata, Kanagawa (JP); Eiki Hirama, Miyagi (JP); Masahiro Noguchi, Miyagi (JP)

(73) Assignee: RICOH COMPANY, LIMITED, Tokyo (JP)

( * ) Notice: Subject to any disclaimer, the term of this patent is extended or adjusted under 35 U.S.C. 154(b) by 201 days.

(21) Appl. No.: 14/208,418

(22) Filed: Mar. 13, 2014

(65) Prior Publication Data
US 2014/0265911 A1 Sep. 18, 2014

(30) Foreign Application Priority Data
Mar. 14, 2013 (JP) .................................. 2013-051936

(51) Int. Cl.
| | |
|---|---|
| H05B 41/16 | (2006.01) |
| H05B 41/24 | (2006.01) |
| H02M 1/08 | (2006.01) |
| H02M 7/537 | (2006.01) |
| H05H 1/24 | (2006.01) |
| B41J 11/00 | (2006.01) |

(52) U.S. Cl.
CPC ................ H02M 1/08 (2013.01); H02M 7/537 (2013.01); H05H 1/2406 (2013.01); *B41J 11/0015* (2013.01); *H05H 2001/2412* (2013.01); *Y02B 70/1441* (2013.01)

(58) Field of Classification Search
USPC ................................................. 315/246–287
See application file for complete search history.

(56) References Cited

U.S. PATENT DOCUMENTS

| | | | |
|---|---|---|---|
| 5,559,486 A | 9/1996 | Ikenoue et al. | |
| 5,757,628 A | 5/1998 | Kamata | |
| 7,274,281 B2* | 9/2007 | Sugioka | H01F 27/2823 315/276 |
| 9,160,225 B2* | 10/2015 | Kamata | H02M 1/32 |
| 2006/0175981 A1* | 8/2006 | Hsueh | H05B 41/2827 315/274 |
| 2007/0024205 A1* | 2/2007 | Suzuki | H05B 41/2827 315/209 R |
| 2008/0150047 A1* | 6/2008 | Bang | H01L 29/518 257/411 |
| 2009/0160355 A1* | 6/2009 | Suzuki | H05B 41/2824 315/291 |

(Continued)

FOREIGN PATENT DOCUMENTS

| | | |
|---|---|---|
| JP | 05-190336 | 7/1993 |
| JP | 06-265864 | 9/1994 |

(Continued)

*Primary Examiner* — Brandon S Cole
(74) *Attorney, Agent, or Firm* — Oblon, McClelland, Maier & Neustadt, L.L.P.

(57) ABSTRACT

An inverter switches input voltage Vin to flow an excitation current to excitation winding Np of a transformer and output to a discharger an alternating voltage Vout from the output winding Ns. In an output circuit flowing a current to the discharger, a voltage-responsive connector is connected in series with the winding Ns to interrupt or connect the output circuit according to a voltage applied to between opposed electrodes. The voltage-responsive connector has characteristics of keeping the electrodes in an insulated state until an instantaneous value of the alternating voltage reaches a predetermined value, and holding the electrodes in a conduction state while the instantaneous value of the alternating voltage has reached the predetermined value and continues to exceed the predetermined value, and quickly returning the electrodes to the insulated state when the instantaneous value of the alternating voltage has fallen below the predetermined value.

10 Claims, 10 Drawing Sheets

(56) References Cited

U.S. PATENT DOCUMENTS

2011/0002446 A1* 1/2011 Beland ............... H05G 1/10
                                                378/111
2011/0235382 A1* 9/2011 Kamata .............. H02M 7/48
                                                363/131
2012/0163058 A1* 6/2012 Kamata .............. H02H 3/33
                                                363/131
2012/0236614 A1  9/2012 Kamata

FOREIGN PATENT DOCUMENTS

| JP | 10-294190 | 11/1998 |
| JP | 3200283 | 6/2001 |
| JP | 2004-281361 | 10/2004 |
| JP | 2011-057442 | 3/2011 |
| JP | 2012-191828 | 10/2012 |

* cited by examiner

HIGH-VOLTAGE INVERTER, DIELECTRIC-BARRIER DISCHARGE EVICE AND CATION APPARATUS

CROSS-REFERENCE TO RELATED APPLICATIONS

The present application claims priority to and incorporates by reference the entire contents of Japanese Patent Application No. 2013-051936 filed in Japan on Mar. 14, 2013.

BACKGROUND OF THE INVENTION

1. Field of the Invention

The present invention relates to an inverter outputting an alternating voltage, a dielectric-barrier discharge generation device using the inverter as power source, and a sheet material modification apparatus using the dielectric-barrier discharge generation device.

2. Description of the Related Art

High-voltage inverters outputting an alternating high voltage are widely used as discharge power source devices or the like for plasma generation devices, ozone generation devices or the like.

For example, atmospheric plasma is used as a means of surface treatment in various industrial products to modify the surface material or eliminate contaminants from the surface or the like. When resin or the like is to undergo a bonding, printing, coating process or the like, pretreating the resin by atmospheric plasma makes it possible to improve the surface in wettability and easily achieve a favorable finish by the bonding, printing, coating or the like.

For example, Japanese Laid-open Patent Publication No. 2011-57442 suggests such a modification apparatus. At the modification apparatus, a discharge electrode roller and counter electrodes are opposed to each other across a carrying belt, a pulsed high voltage is applied to between the roller and the electrodes to generate dielectric-barrier discharge due to creeping discharge. Accordingly, atmospheric plasma is generated and brought into even contact with a surface of the sheet material to be processed.

In such a process of modifying the surface of the sheet material, to produce stable dielectric-barrier discharge for generating atmospheric plasma, it is necessary to stably supply high power resulting from an alternating high voltage of several KV to several tens of KV to between the discharge electrodes and the counter electrodes opposed to each other across a dielectric as a load.

Japanese Laid-open Patent Publication No. 2012-191828 discloses a high-voltage inverter (device) suitable as such a power source, for example.

The high-voltage inverter switches an input voltage in which a pulse flow is superimposed on a direct current or a direct current component to flow an excitation current to the primary excitation winding of a transformer and output an alternating high voltage from a secondary output winding.

The "alternating high voltage" here refers to not a sinusoidal alternating high voltage uniform in positive and negative poles but a high voltage with a pulsed or pulse-flow alternating waveform that results from a flyback pulse generated on the output winding due to intermittence of an excitation current from the transformer.

Such a conventional high-voltage inverter is basically configured as illustrated in FIG. 12. The high-voltage inverter 100 includes a transformer 13 that has as input voltage Vin a direct-current voltage (possibly including a pulse-flow component) obtained by rectifying and smoothing an alternating voltage from a commercial power source 11 by a rectifying/smoothing circuit 12; a switching element 14 formed by FET or the like; and a control circuit 15.

The transformer 13 has excitation winding Np and output winding Ns. The excitation winding Np is connected to a feed circuit from the rectifying/smoothing circuit 12 in series with the switching element 14. The switching element 14 is on-off controlled by a switching signal Sp output from the control circuit 15 to a gate terminal thereof.

The switching signal Sp applied from the control circuit 15 to the gate of the switching element 14 has a rectangular wave as illustrated in FIG. 13(a). The low-level period of the switching signal Sp is the OFF period, and the high-level period of the same is the ON period. Reference sign T denotes one period.

The high-voltage inverter 100 illustrated in FIG. 12 is a flyback voltage resonant inverter. Therefore, input voltage Vin is switched by the switching element 14 to turn on or off an excitation current to be flown into the excitation winding Np of the transformer 13. In the ON period, excitation energy is stored in the excitation winding Np, and in the OFF period, the energy is discharged from the output winding Ns of the transformer 13 to output to a load 2 output voltage Vout of the waveform as illustrated in FIG. 13(b).

Therefore, the output voltage Vout is a high voltage according to the turn ratio of the excitation winding Np to the output winding Ns, and has a half-wave type of an approximately sinusoidal waveform as illustrated in FIG. 13(b). In this example, the output voltage Vout is a positive (+) voltage equivalent to a positive half wave, but may be a negative (−) voltage equivalent to a negative half wave.

A voltage of such a waveform or a waveform close to the same will be referred herein to as alternating high voltage.

However, the output voltage Vout of the high-voltage inverter 100 does not actually have a proper half-wave sinusoidal waveform as illustrated in FIG. 13(b).

The output voltage Vout is generated by a parallel resonant circuit including inductance Ls of the output winding Ns, and composite capacity C of distributed capacity Cs of the output winding Ns and equivalent capacity (load capacity) Co in the load 2.

Then, the output voltage Vout alternating at a high voltage generates a strong magnetic field in its output path. As a result, as illustrated in FIG. 14, a steep transient current flows as output current Iout at ON/OFF switching of the switching element 14, and immediately after that, an oscillating transient voltage (ringing) is generated.

FIG. 15 is an enlarged view of the waveform of the output voltage Vout enclosed in dotted circle A in FIG. 14 immediately after the switching element 14 turns off.

Such a transient voltage results from a surge voltage generated at ON/OFF switching of an excitation current and an attenuated oscillating voltage, and may reach 10 to 20% of crest value of the output voltage Vout even at stable operation time.

The transient voltage leads to a decrease in fundamental high value as an inverter output generated at the output winding in the OFF period of the excitation current, and dispersion of output energy, which may be excessive output not used in a load.

For example, when the load 2 illustrated in FIG. 12 is a dielectric-barrier discharger and the dielectric-barrier discharge start voltage is 6 KV, portions of the output voltage Vout falling below 6 KV do not contribute to dielectric-barrier discharge.

Accordingly, the generation of oscillating transient voltages as described above lead to reductions in efficiency and reliability of the inverter, heat generation, and the like. Further, there is a possibility that electromagnetic noise is dispersed to cause radio disturbances at peripheral devices.

The foregoing problems become more pronounced with a higher output voltage of the inverter. However, no effective measures have been taken on high-voltage inverters in which the output voltage is an alternating high voltage of several KV to several tens of KV.

To absorb surge currents and transient voltages generated at the primary side of a transformer, it is known to provide a snubber circuit composed of a resistor or an inductor, a capacitor, a diode, and the like.

However, when a snubber circuit is provided at the secondary side of a transformer in a high-voltage inverter as described above, a desired output voltage cannot be obtained due to a resonance shift. The components of the snubber circuit need to have pressure resistance about three times that to the output voltage. However, in the case where the output voltage is several tens of KV, it is difficult to obtain existing components with such pressure resistance. Thus, no snubber circuit can be virtually provided at the secondary side of a transformer.

SUMMARY OF THE INVENTION

It is an object of the present invention to at least partially solve the problems in the conventional technology.

According to the present invention, there is provided an inverter that switches an input voltage to flow an excitation current to an excitation winding of a transformer, and outputs an alternating voltage from a secondary output winding of the transformer, wherein in an output circuit that flows a current to a load by the alternating voltage output from the output winding of the transformer, a voltage-responsive connector is connected in series with the output winding to interrupt or connect the output circuit according to a voltage applied to between opposed electrodes by the alternating voltage, and the voltage-responsive connector has characteristics of keeping the electrodes in an insulated state until an instantaneous value of the alternating voltage reaches a predetermined value, and holding the electrodes in a conduction state while the instantaneous value of the alternating voltage has reached the predetermined value and continues to exceed the predetermined value, and quickly returning the electrodes to the insulated state when the instantaneous value of the alternating voltage has fallen below the predetermined value.

The present invention also provides a dielectric-barrier discharge generation device comprising: an inverter that switches an input voltage to flow an excitation current to an excitation winding of a transformer, and outputs an alternating voltage from a secondary output winding of the transformer, wherein in an output circuit that flows a current to a load by the alternating voltage output from the output winding of the transformer, a voltage-responsive connector is connected in series with the output winding to interrupt or connect the output circuit according to a voltage applied to between opposed electrodes by the alternating voltage, and the voltage-responsive connector has characteristics of keeping the electrodes in an insulated state until an instantaneous value of the alternating voltage reaches a predetermined value, and holding the electrodes in a conduction state while the instantaneous value of the alternating voltage has reached the predetermined value and continues to exceed the predetermined value, and quickly returning the electrodes to the insulated state when the instantaneous value of the alternating voltage has fallen below the predetermined value; and a discharger as a load to which the alternating voltage output from the output winding of the transformer in the inverter is applied, wherein the discharger has a discharge electrode and a counter electrode across a dielectric, the alternating voltage is applied to between the discharge electrode and the counter electrode to generate creeping discharge or silent discharge, or dielectric-barrier discharge by a composite discharge of creeping discharge and silent discharge.

The present invention also provides a sheet material modification apparatus comprising: a dielectric-barrier discharge generation device comprising an inverter that switches an input voltage to flow an excitation current to an excitation winding of a transformer, and outputs an alternating voltage from a secondary output winding of the transformer, wherein in an output circuit that flows a current to a load by the alternating voltage output from the output winding of the transformer, a voltage-responsive connector is connected in series with the output winding to interrupt or connect the output circuit according to a voltage applied to between opposed electrodes by the alternating voltage, and the voltage-responsive connector has characteristics of keeping the electrodes in an insulated state until an instantaneous value of the alternating voltage reaches a predetermined value, and holding the electrodes in a conduction state while the instantaneous value of the alternating voltage has reached the predetermined value and continues to exceed the predetermined value, and quickly returning the electrodes to the insulated state when the instantaneous value of the alternating high voltage has fallen below the predetermined value; and a discharger as a load to which the alternating voltage output from the output winding of the transformer in the inverter is applied, wherein the discharger has a discharge electrode and a counter electrode across a dielectric, the alternating voltage is applied to between the discharge electrode and the counter electrode to generate creeping discharge or silent discharge, or dielectric-barrier discharge by a composite discharge of creeping discharge and silent discharge; wherein a sheet material is carried between the discharge electrode and the dielectric in the dielectric-barrier discharge generation device to modify the sheet material by the dielectric-barrier discharge.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments for carrying out the present invention will be described below in detail with reference to the drawings.

Figure 1:
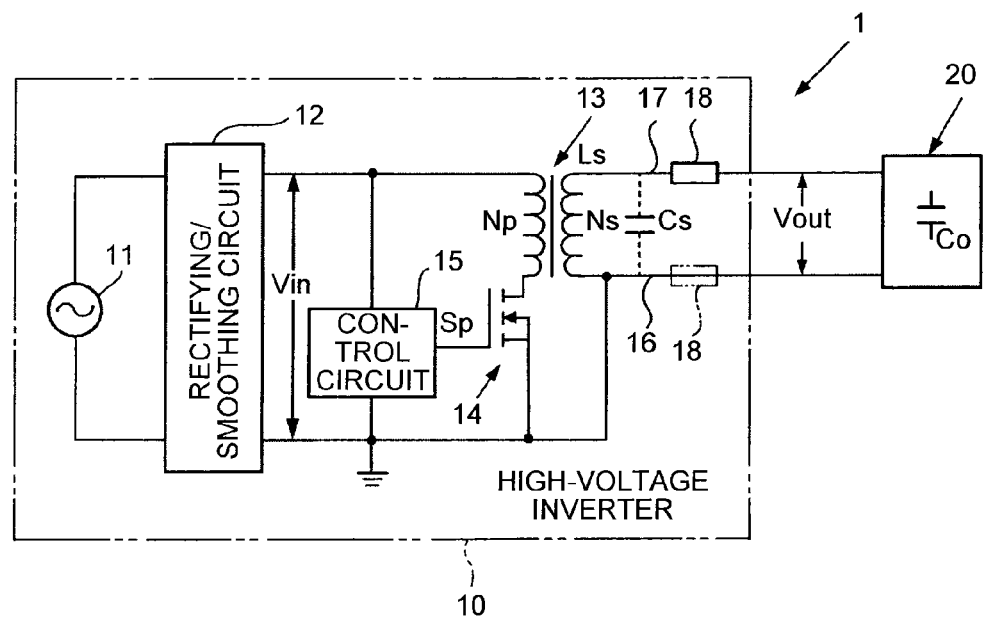
FIG. 1 is a circuit diagram illustrating one embodiment of a dielectric-barrier discharge generation device using an inverter as a power source according to the present invention.

FIG. 1 is a circuit diagram illustrating one embodiment of a dielectric-barrier discharge generation device using a high-voltage inverter as a power source according to the present invention. The same components illustrated in FIG. 1 as those illustrated in FIG. 12 are given the same reference signs as those in FIG. 12, and descriptions thereof will be omitted or simplified.

A dielectric-barrier discharge generation device 1 is formed by a high-voltage inverter 10 and a discharger 20 as a load of the high-voltage inverter 10.

Figure 12:
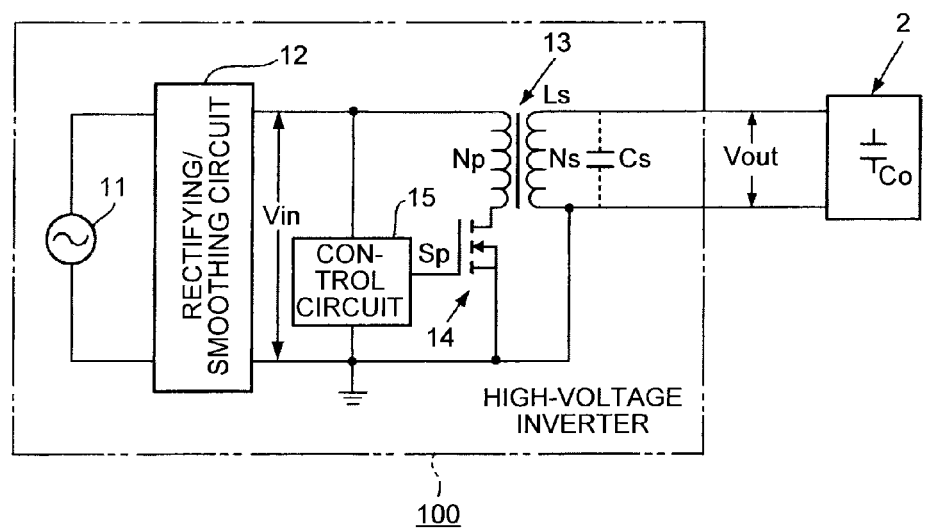
FIG. 12 is a circuit diagram illustrating a basic configuration example of a conventional high-voltage inverter.
Figure 13:
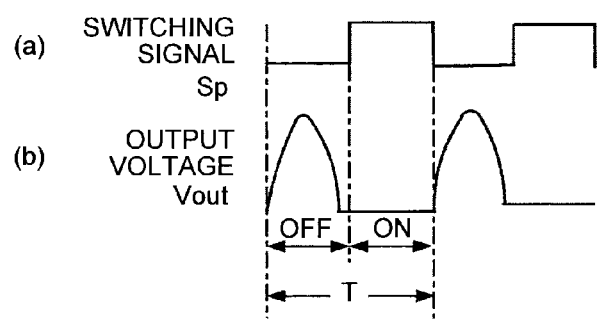
FIG. 13 is a waveform chart illustrating one example of switching signal Sp and output voltage Vout illustrated in FIG. 12.

The high-voltage inverter 10 is basically the same in configuration as a high-voltage inverter 100 described in FIG. 12. Input voltage Vin is obtained by rectifying and smoothing an alternating voltage from a commercial power source 11 at a rectifying/smoothing circuit 12. Alternatively, the input voltage Vin may be obtained by superimposing a pulse flow on a direct-current voltage or a direct-current component or by full-wave rectifying an alternating current from a commercial power source.

The input voltage Vin is switched by a switching element 14 such as FET to flow an excitation current in excitation winding Np of a transformer 13. Then, output voltage Vout as an alternating high voltage is output from secondary output winding Ns of the transformer 13.

The switching element 14 is under ON/OFF control by a switching signal Sp output from the control circuit 15 to a gate terminal thereof.

The output voltage Vout can be controlled by the control circuit 15 performing pulse width modification (PWM) control on the switching signal Sp to change the ratio (duty) of ON period to FF period in one cycle. The control circuit 15 may change the frequency and cycle of the switching signal Sp.

In an actual circuit, a capacitor and a diode and the like constituting a snubber circuit are connected in parallel to the excitation winding Np, and a protective resistor is connected in series with a signal line from the control circuit 15 to the gate of the switching element 14. However, the foregoing arrangement is not in direct relation with the present invention and thus is not illustrated.

Figure 14:
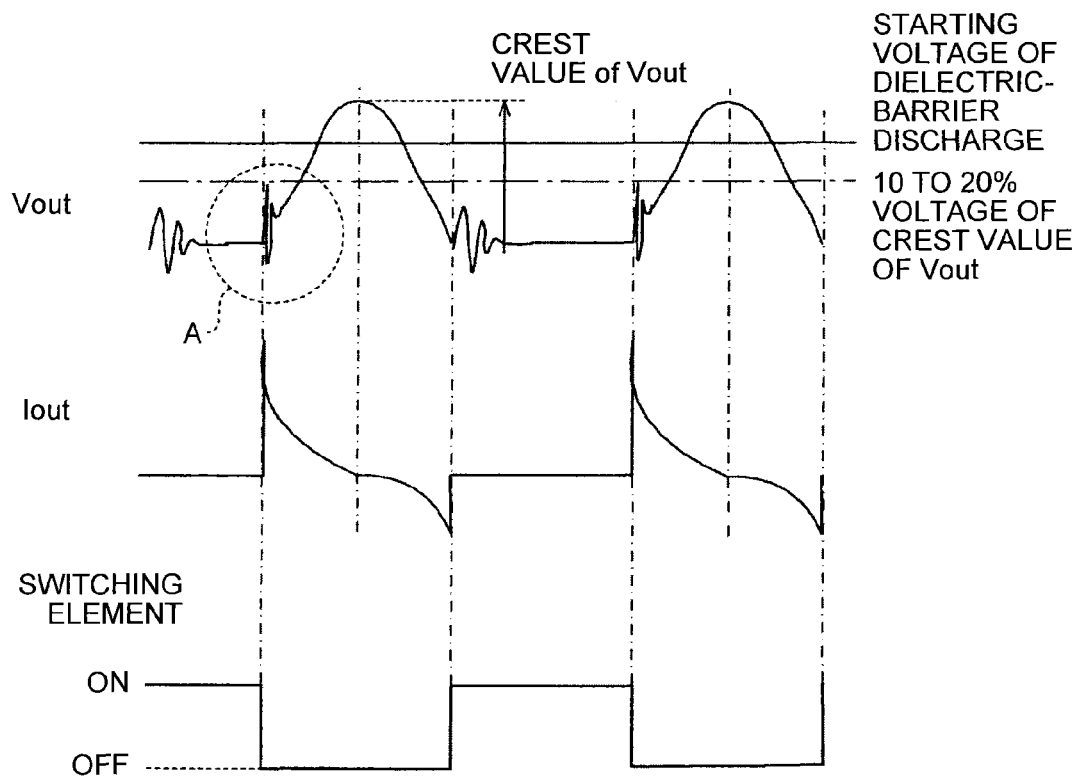
FIG. 14 is a waveform chart for describing an actual output voltage waveform and the like of the conventional high-voltage inverter.
Figure 15:
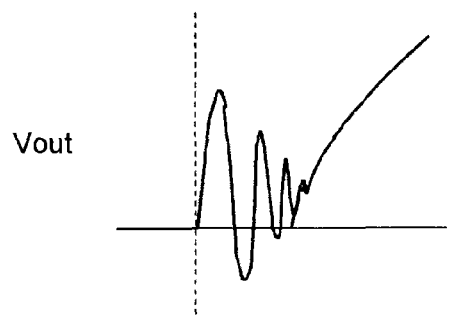
FIG. 15 is an enlarged view of a waveform of a portion of the output voltage Vout enclosed in dotted circle A illustrated in FIG. 14.

The high-voltage inverter 10 illustrated in FIG. 1 is also a flyback voltage resonant inverter. Therefore, the switching element 14 saves excitation energy in the excitation winding Np in the ON period, and outputs, in the OFF period, the output voltage Vout as an alternating high voltage of a waveform as illustrated in FIG. 14 from the output winding Ns of the transformer 13. The switching element 14 applies the output voltage Vout to between electrodes of the discharger 20 as a load.

The output voltage Vout is a high voltage that is generated by a parallel resonant circuit including inductance Ls of the output winding Ns, and a composite capacity C of distributed capacity Cs of the output winding Ns and equivalent capacity (load capacity) Co of the discharger 20, according to the turn ratio of the excitation winding Np to the output winding Ns.

The high-voltage inverter 10 is different from the conventional high-voltage inverter 100 described in FIG. 12 in that a voltage-responsive connector 18 is inserted in series in an output circuit that flows a current to the load by the output voltage Vout output from the output winding Ns of the transformer 13. The voltage-responsive connector 18 is connected in series with the output winding Ns to interrupt or connect the output circuit according to the voltage applied to between opposed electrodes by the output voltage Vout as an alternating high voltage.

Specifically, the voltage-responsive connector 18 keeps the opposed electrodes in an insulated state until the instantaneous value of the alternating high voltage generated by the output winding Ns reaches a predetermined value (threshold value), and holds the opposed electrodes in a conduction state while the instantaneous value of the alternating high voltage has reached the predetermined value and then continues to exceed the predetermined value. The voltage-responsive connector 18 also has the characteristics of, when the instantaneous value of the alternating high voltage has fallen below the predetermined value, returning rapidly the opposed electrodes to the insulated state.

The voltage-responsive connector 18 may be inserted in anywhere within the output circuit that flows a current to the load by the output voltage Vout output from the output winding Ns of the transformer 13. In the embodiment, the voltage-responsive connector 18 is inserted in a high voltage-side output line 17, but may be inserted in an earth-side output line 16 as indicated by a virtual line.

Advantages of inserting the voltage-responsive connector 18 in the output circuit of the high-voltage inverter 10 and details of the voltage-responsive connector 18 and others will be described later.

Figure 2:
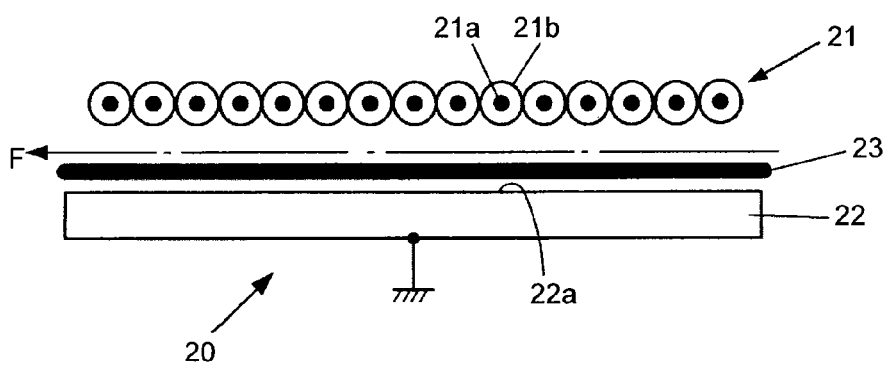
FIG. 2 is a schematic side view of a configuration example of a discharger 20 as a load of the inverter 10 illustrated in FIG. 1.

As illustrated in FIG. 2, the discharger 20 includes discharge electrodes 21, a counter electrode 22 opposed to the discharge electrodes 21, and a dielectric 23 intervening between the discharge electrodes 21 and the counter electrode 22.

The discharge electrodes 21, in the embodiment, constitute a discharge electrode line by a plurality of (15 in the illustrated example) round-bar discharge electrodes 21 in which highly conductive metal lines 21a of copper, aluminum, or the like are covered with insulators (dielectrics) 21b. Specifically, the plurality of discharge electrodes 21 is aligned in a plane parallel to an opposed surface 22a of the flat plate-shaped counter electrode 22, such that the horizontally adjacent electrodes contact each other at the outer peripheries as illustrated in FIG. 2, and extends in a direction vertical to the drawing sheet surface. The diameter (φ) of the discharge electrodes 21 is about 8 mm, for example.

The counter electrode 22 is a flat plate-shaped electrode that is made from highly conductive metal such as copper or aluminum and also serves as a heat radiator. The dielectric 23 such as a silicon-based sheet is attached to the opposed surface 22a of the counter electrode 22 with respect to the discharge electrodes 21. In FIG. 2, for ease of understanding, there is a gap left between the counter electrode 22 and the dielectric 23, but in actuality, the counter electrode 22 and the dielectric 23 are closely attached to each other by adhesion or the like.

In the drawing, there is also a wide space between the discharge electrodes 21 and the dielectric 23, but in actuality, it is only necessary to provide a space to let a sheet material to be surface-modified pass through as indicated by dashed-dotted arrowed line F, for example.

The foregoing output voltage Vout as an alternating high voltage of the high-voltage inverter 10 is applied to between the respective discharge electrodes 21 and the counter electrode 22 of the thus configured discharger 20. Accordingly, when a high voltage of 6 KV or more is applied at the atmospheric pressure, generated is creeping discharge, silent discharge, or dielectric-barrier discharge by a combination of creeping discharge and silent discharge.

The counter electrode 22 is grounded. Even if the voltage applied to the discharge electrodes 21 is reversed in polarity, the same operations and advantages can be achieved.

Therefore, it is possible to let atmospheric plasma contact a sheet material passing through between the line of the discharge electrodes 21 and the dielectric 23 as indicated by the arrowed line F, and make a uniform modification to the sheet material.

Diameter of the discharge electrodes 21, thickness of the metal lines 21a, outer peripheral shape of, intervals between, and number of the insulators (dielectrics) 21b, and the like can be appropriately changed according to the purpose of use. The discharge electrodes 21 may be supported so as to be capable of being dragged around or rotated in a vertical direction.

Next, operations and advantages of the high-voltage inverter and the dielectric-barrier discharge generation device in the embodiment will be described with reference to FIGS. 3 to 5.

Figure 3:
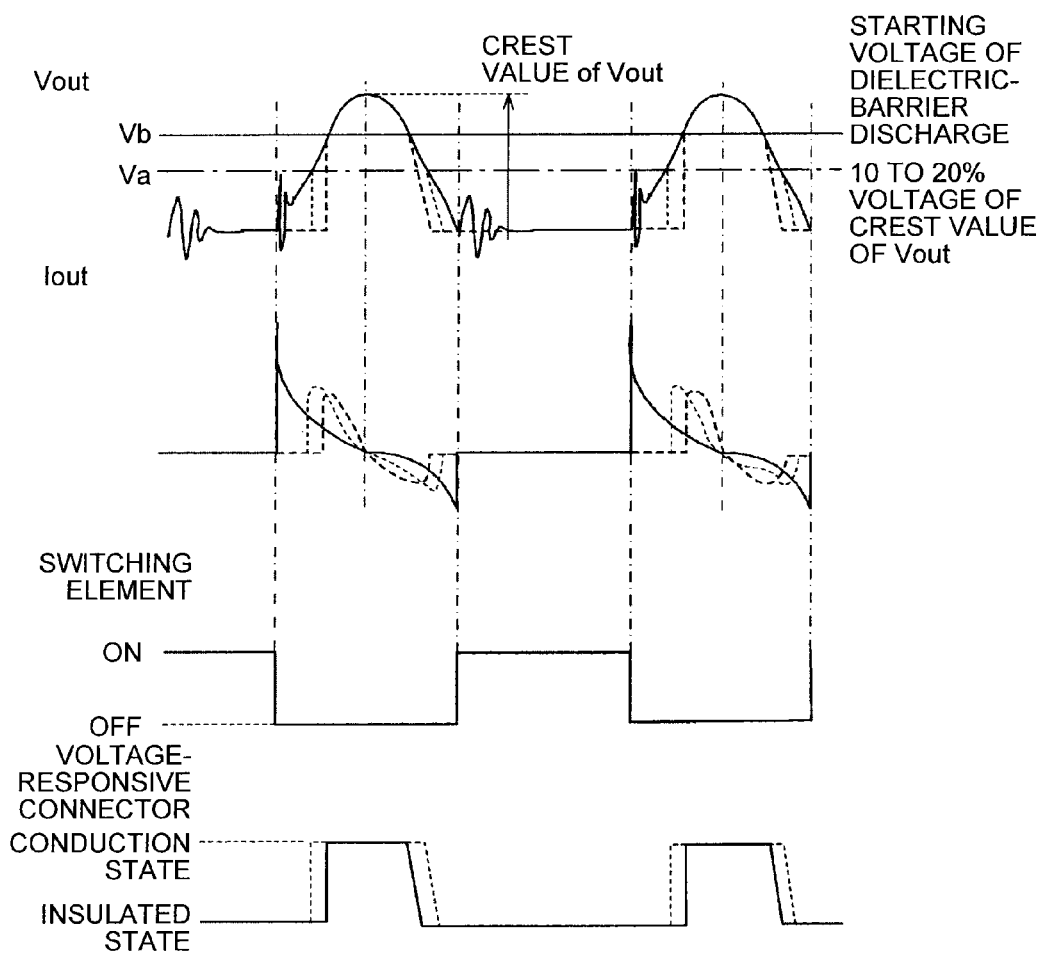
FIG. 3 is a waveform chart for describing an operation example of the inverter according to the present invention.

FIG. 3 is a waveform chart corresponding to FIG. 14 in which the waveforms of the output voltage Vout and the output current Iout indicated by solid lines and the ON/OFF waveform of the switching element 14 are the same as those illustrated in FIG. 14. Added to FIG. 3 is a waveform representing changes between the conduction state and the insulated state of the voltage-responsive connector 18. Voltage Va in the level illustrated by a dashed-dotted line is a voltage of 10 to 20% (e.g. 2 KV) of a crest value (e.g. 10 KV) of the output voltage Vout, and voltage Vb in the level illustrated by a solid line is a starting voltage (e.g. 6 KV) of dielectric-barrier discharge from the discharger 20.

Represented by dotted lines are the waveforms of output voltage Vout and input current Iout applied to the load when the predetermined value (threshold value) of an applied voltage at which the voltage-responsive connector 18 changes the opposed electrodes from the insulated state to the conduction state is set to voltage Va of 10 to 20% of the crest value of the output voltage Vout.

In addition, represented by dotted lines is a waveform that indicates changes between the conduction state and the insulated state of the voltage-responsive connector 18 in that case.

Operations of the voltage-responsive connector 18 with the predetermined value (threshold value) set to voltage Va will be described.

Until the instantaneous value of an alternating high voltage generated at the output winding Ns of the transformer 13 illustrated in FIG. 1 reaches voltage Va, the voltage-responsive connector 18 keeps the opposed electrodes in the insulated state to interrupt the output circuit flowing a current to the discharger 20 as the load.

When the instantaneous value of the alternating high voltage has reached the voltage Va, the voltage-responsive connector 18 brings the opposed electrodes into the conduction state to connect the output circuit. After that, while the instantaneous value of the alternating high voltage exceeds voltage Va, the voltage-responsive connector 18 holds the electrodes in the conduction state to keep the connection of the output circuit.

When the opposed electrodes of the voltage-responsive connector 18 has entered the conduction state, the voltage between the electrodes becomes almost zero, and while the applied voltage exceeds the voltage Va as the predetermined value, there is a time lag to keep the conduction state. Since the time of the time lag is longer than the time during which the instantaneous value of the alternating high voltage exceeds the voltage Va, the voltage-responsive connector 18 holds the opposed electrodes in the conduction state.

Then, when the instantaneous value of the alternating high voltage has fallen below voltage Va, the voltage-responsive connector 18 returns quickly the opposed electrodes to the insulated state to interrupt the output circuit.

Figure 4:
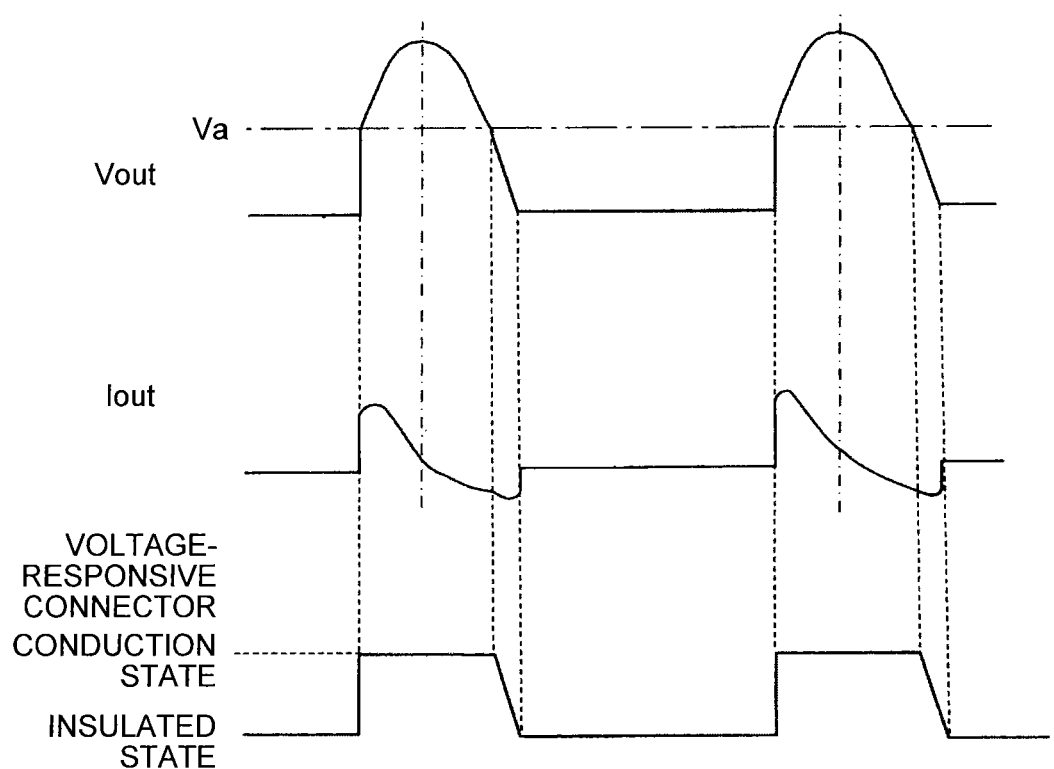
FIG. 4 is a waveform chart for describing an operation example where a predetermined value of a voltage at which a voltage-responsive connector becomes conductive accounts for 10 to 20% of a crest value of the output voltage.

FIG. 4 illustrates the waveforms of the output voltage Vout and output current Iout and the waveform of changes between the conduction state and the insulated state of the voltage-responsive connector 18 in the foregoing case.

Since the voltage-responsive connector 18 operates in such a manner as described above, there is no flow of a steep transient current as illustrated as output current Iout in FIG. 3 at ON/OFF switching of the switching element 14, thereby to suppress occurrence of oscillating transient voltages (ringing). In addition, even if an oscillating transient voltage (ringing) occurs between the both terminals of the output winding Ns of the transformer 13, the crest value of the current does not reach the voltage Va set as the predetermined value. Accordingly, the output circuit is interrupted by the voltage-responsive connector 18, and thus the transient voltage is not applied to the discharger 20.

Since the voltage Va as the predetermined value is smaller than the voltage Vb as starting voltage of dielectric-barrier discharge from the discharger 20, the transient voltages not reaching the voltage Va are useless voltages that do not contribute to the dielectric-barrier discharge from the discharger 20. Therefore, there is no problem even if the transient voltages not reaching the voltage Va are not applied to the discharger 20.

The high-voltage inverter 10 operates in such a manner as not to output useless transient voltages, thereby to increase efficiency and reliability without decreasing the crest value of the output voltage. The high-voltage inverter 10 also suppresses energy loss due to useless transient voltages and reduces heat generation, vibration, noise, and the like. Further, the high-voltage inverter 10 suppresses dispersion of electromagnetic noise due to transient voltages (ringing) to prevent occurrence of radio disturbances at peripheral devices.

Next, operations of the high-voltage inverter 10 in which the predetermined value (threshold value) is set at the voltage Vb (Vb>Va) illustrated in FIG. 3, that is, the starting voltage of dielectric-barrier discharge from the discharger 20, will be described.

FIG. 3 illustrates by broken lines the waveforms of the output voltage Vout and output current Iout applied to the load in the foregoing case.

In this case, until the instantaneous value of an alternating high voltage generated at the output winding Ns of the transformer 13 illustrated in FIG. 1 reaches the voltage Vb, the voltage-responsive connector 18 keeps the opposed electrodes in the insulated state to interrupt the output circuit flowing a current to the discharger 20 as the load.

When the instantaneous value of the alternating high voltage has reached the voltage Vb, the voltage-responsive connector 18 brings the opposed electrodes into the conduction state to connect the output circuit. After that, while the instantaneous value of the alternating high voltage exceeds the voltage Vb, the voltage-responsive connector 18 holds the opposed electrodes in the conduction state to keep the connection of the output circuit. The reason for that is the same as that described above.

Then, when the instantaneous value of the alternating high voltage has fallen below the voltage Vb, the voltage-responsive connector 18 quickly returns the opposed electrodes to the insulated state to interrupt the output circuit.

Figure 5:
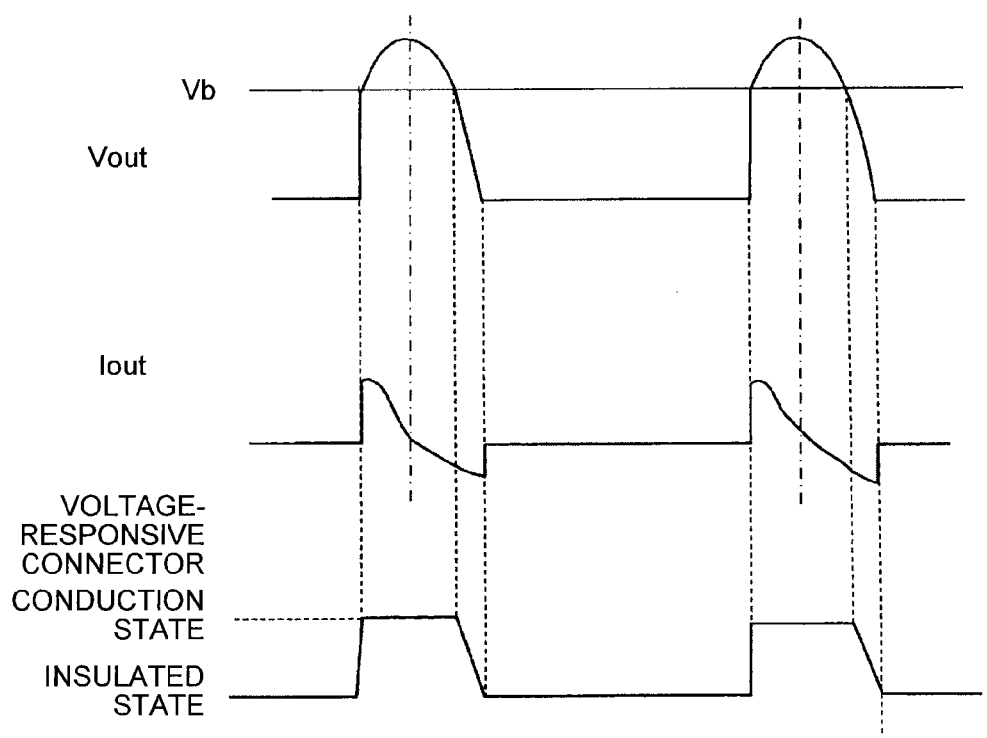
FIG. 5 is a waveform chart for describing an operation example where a predetermined value of a voltage at which a voltage-responsive connector becomes conductive is a dielectric-barrier discharge starting voltage.

FIG. 5 illustrates the waveforms of the output voltage Vout and output current Iout and the waveform indicating changes between the conduction state and the insulated state of the voltage-responsive connector 18 in the foregoing case.

In this case, the operations and advantages are the same as those described above, but only voltages in a level contributing to dielectric-barrier discharge are applied to the discharger 20 as the load and all transient voltages not contributing to dielectric-barrier discharge are blocked. Therefore, it is possible to further enhance efficiency and suppress occurrence of electromagnetic noise.

As illustrated in FIGS. 4 and 5, the rise time of the output voltage Vout applied to the discharger 20 is extremely short, and thus the voltage applied to between the discharge electrodes 21 and the counter electrode 22 of the discharger 20 quickly changes from 0 to the discharge starting voltage. This makes dielectric-barrier discharge prone to occur.

The fall time of the output voltage Vout is slightly longer, but there is no problem because transient voltages can be sufficiently removed. The output voltage waveform is a slightly deformed half-wave sine wave due to the presence of downtimes at the feet of sine wave. However, it is confirmed that high-order harmonics, surge voltages generated at on/off of the switching element 14, and oscillating transient voltages associated with the surge voltages are suppressed and a clear but slightly deformed sine wave is formed.

Figure 6:
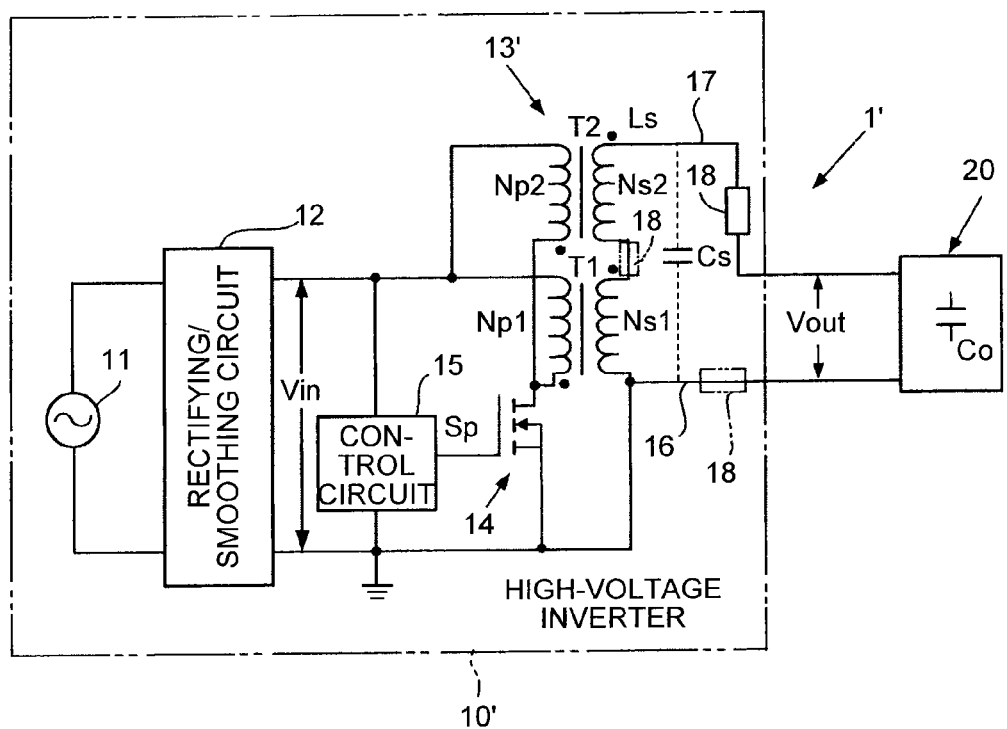
FIG. 6 is a circuit diagram illustrating another embodiment of a dielectric-barrier discharge generation device using the inverter as a power source according to the present invention.

FIG. 6 illustrates another embodiment of a dielectric-barrier discharge generation device with the high-voltage inverter as a power source according to the present invention. In FIG. 6, the components equivalent to those illustrated in FIGS. 1 and 12 are given the same reference signs as those in FIGS. 1 and 12, and descriptions thereof will be omitted.

A dielectric-barrier discharge generation device 1' illustrated in FIG. 6 is the same as the dielectric-barrier discharge generation device 1 illustrated in FIG. 1 except for a transformer 13' constituting a high-voltage inverter 10'.

The transformer 13' constituting the high-voltage inverter 10' is composed of a plurality of individual (magnetically separated) transformers T1 and T2 having the same characteristics.

Excitation windings Np1 and Np2 of the transformers T1 and T2 are connected in parallel such that the switching element 14 excites the excitation windings Np1 and Np2 at the same time by the input voltage Vin in the on period. In addition, output windings Ns1 and Ns2 of the transformers T1 and T2 are connected together in series, and terminals not connected together of the transformers T1 and T2 are connected to the earth-side output line 16 and the high voltage-side output line 17 to generate the output voltage Vout as an alternating high voltage between the two each.

In this case, time axes of the output voltage waveforms of the output windings Ns1 and Ns2 are synchronized. The output voltages can be made higher with an increase in the value of Q indicative of resonance sharpness at the secondary side of the transformer 13'.

By configuring the transformer 13' in such a manner, it is possible to combine the output voltages generated at the output windings Ns1 and Ns2 of the transformers T1 and T2 and supply a further higher-voltage and higher-power output to the discharger 20 to generate stronger dielectric-barrier discharge.

In the embodiment, the voltage-responsive connector 18 is also inserted into the high voltage-side output line 17 and connected in series with the output windings Ns1 and Ns2. As illustrated by virtual lines, the voltage-responsive connector 18 may be inserted into the earth-side output line 16 or may be inserted into the connection portion between the output windings Ns1 and Ns2 in this case.

The operations and advantages of the voltage-responsive connector 18 are the same as those in the foregoing embodiment and thus descriptions thereof will be omitted.

The transformer for voltage conversion in the high-voltage inverter may be formed by three or more separate transformers having the same characteristics. By connecting a larger number of transformers, it is possible to make the switching element 14 lower in pressure resistance and, in the case of MOSFETs, use elements with low on resistance. For example, even in the case where three MOSFETs need to be driven in parallel, driving only two MOSFETs in parallel will suffice.

As an actual example, in the case where the input voltage Vin is 56 V, the output voltage Vout is 10.5 KV, and the average output is 20 to 800 W, two transformers has a pressure resistance of 900 V, whereas three transformers offers a pressure resistance of 600 V. Accordingly, the switching element 14 significantly decreases in on resistance and improves in efficiency (output power/input power).

In actuality, however, the loop length and installation area of the transformers become larger according to the number of the transformers, which may lead to problems of causing unnecessary radiation and increasing device size. Therefore, it is considered that the practical number of transformers is up to four or the like.

Next, the foregoing voltage-responsive connector 18 will be described.

The voltage-responsive connector 18 includes opposed electrodes 18a and 18b, and the section between the electrodes is filled with a dielectric such as ceramic, an incombustible gas, or the like. The voltage-responsive connector 18 has lead terminals 18c and 18d connected to the electrodes 18a and 18b, respectively, and projected outward. The lead terminals 18c and 18d are connected to the output circuit such as the output line 16 or 17 illustrated in FIG. 1 or 6.

The opposed area, interval (distance) d between the electrodes 18a and 18b can be adjusted such that, when a voltage applied to between the electrodes 18a and 18b reaches a preset voltage value (foregoing predetermined value such as voltage Va or Vb), the section between the electrodes changes from the insulated state to the conduction state.

Figure 8:
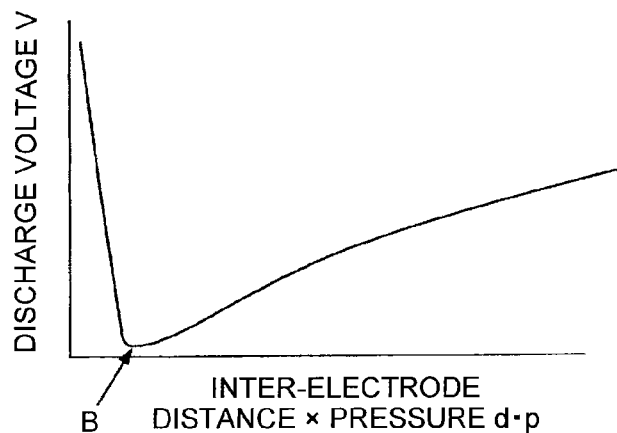
FIG. 8 is a linear diagram illustrating the relationship between inter-electrode distance×pressure and discharge voltage based on Paschen's law.

When the section between the electrodes opposed in parallel is filled with a gas, Paschen's law is applied to discharge between the electrodes. In that case, discharge voltage V between the opposed electrodes is a function of product of inter-electrode distance d(m) and gas pressure p (Torr) that is expressed as V=f(p·d) and is represented as in FIG. 8.

Thus, the gas pressure p and the inter-electrode distance d are adjusted such that the voltage applied to between the opposed electrodes becomes a discharge voltage when reaching the foregoing voltage Va or Vb. The gas pressure p and the inter-electrode distance d are desirably adjusted so as to form valley B illustrated in FIG. 8 with the least loss.

Used as a discharge gas between electrodes of a general surge absorption component is a rare gas such as argon, neon, helium, or xenon, or a single inert gas such as nitrogen gas or a mixed gas, for example. In addition, there is a surge absorption component such as an arrester (lighting guard) that uses as a discharge gas a mixture of a single or mixed rare gas or inert gas and a gas including halogen or a negative gas such as $O_2$.

Conventionally, such surge absorption components are used to absorb surge voltages or currents infrequently and suddenly occurring for a short time to protect devices and circuits. Thus, many of the components are made small in size with a short inter-electrode distance and a small electrode area.

In contrast, the voltage-responsive connector 18 used in the high-voltage inverter according to the present invention is connected in series in the output circuit of an alternating high voltage in excess of several KV (alternating high voltage), to continuously operate with repeated application of the alternating high voltage. Thus, the voltage-responsive connector 18 needs to have sufficient pressure resistance and durability.

The opposed electrodes of the voltage-responsive connector 18 may be parallel flat plates, or a combination of a concave electrode and a convex electrode, or the like. Material for the electrodes needs to include a metal with a high melting point, and have high thermal conductivity, thickness, and a sufficient area according to required power.

Some of the existing arresters (lighting guards) have a pressure resistance of 5 KV, 6 KV, 8 KV or the like and thus these arresters can be used in the present invention.

Figure 9:
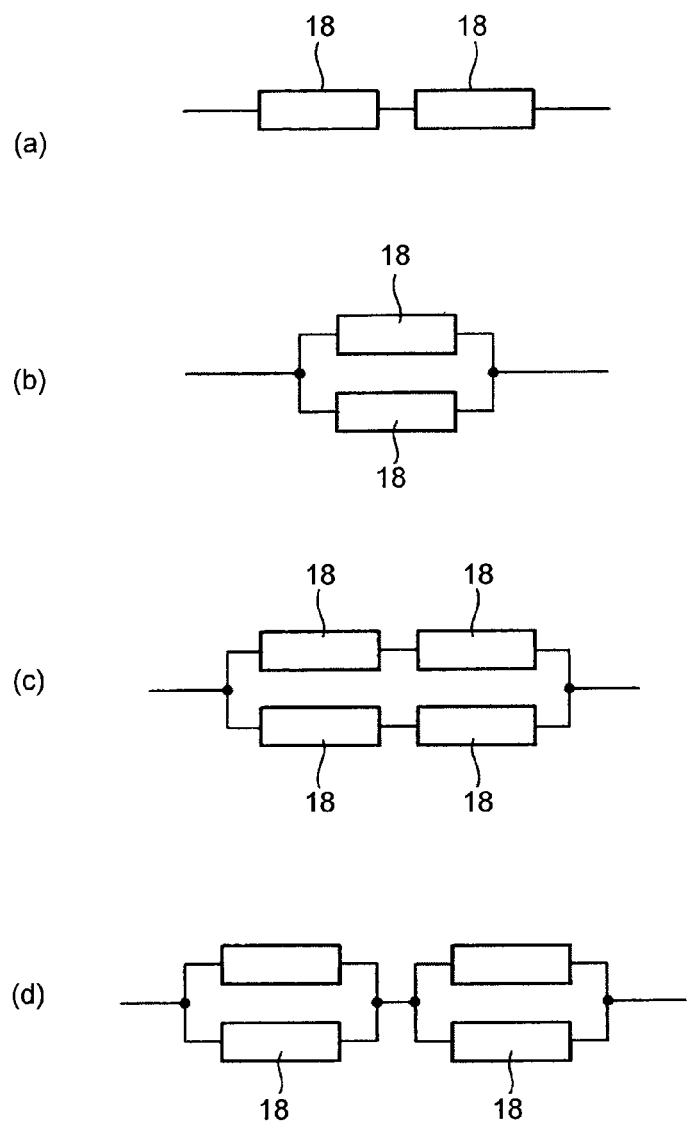
FIG. 9 is a diagram illustrating connection examples in which a plurality of voltage-responsive connectors is connected together.

If no sufficient withstand voltage and power can be obtained by one voltage-responsive connector 18, a plurality of voltage-responsive connectors 18 may be connected in series as illustrated in FIG. 9(a) for voltage division or may be connected in parallel as illustrated in FIG. 9(b) for current division.

Further, a plurality of voltage-responsive connectors 18 in series may be connected in parallel as illustrated in FIG. 9(c) or a plurality of voltage-responsive connectors 18 in parallel may be connected in series as illustrated in FIG. 9(d) to make a combination of serial and parallel patterns. The number of the voltage-responsive connectors 18 connected in series or in parallel may be three or more.

The plurality of thus connected voltage-responsive connectors is inserted into the output circuit of the high-voltage inverters 10 or 10' as with the voltage-responsive connector 18 illustrated in FIG. 1 or 6.

This is effective in dispersing heat generated by the voltage-responsive connectors 18 and preventing deterioration of the electrodes.

Further, the voltage-responsive connectors 18 for use in the present invention always operate and generate heat, and thus it is desired to sufficiently dissipate heat from the voltage-responsive connectors 18.

Figure 10:
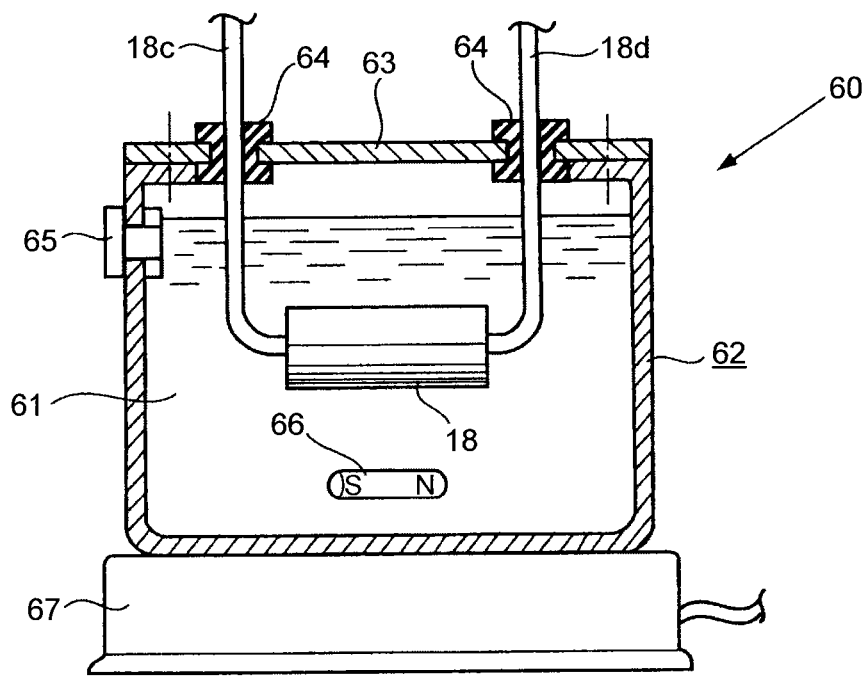
FIG. 10 is a cross-section view illustrating one example of a unit that dissipates heat from the voltage-responsive connector.

FIG. 10 is a cross-section view of an example of a unit that dissipates heat generated by the voltage-responsive connector. A heat dissipater 60 as the heat dissipation unit illustrated in FIG. 10 includes a container 62 that immerses and stores the voltage-responsive connector 18 in insulating oil 61 as an incombustible fluid, and a unit that stirs the insulating oil 61 in the container 62.

The voltage-responsive connector 18 is immersed and held in the insulating oil 61 by extending the lead terminals 18c and 18d of the voltage-responsive connector 18 through insulating seal materials 64 fitted into a pair of holes in a lid plate 63 adhered and fixed to an upper opening of the container 62.

The container 62 has an explosion-proof valve 65 on a side surface. When the pressure in the container 62 exceeds a set value, the explosion-proof valve 65 opens to communicate the container 62 with the outside to lower the internal pressure and prevent explosion of the container 62, thereby assuring safety.

Figure 7:
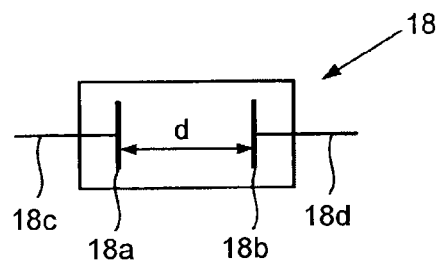
FIG. 7 is a diagram for describing a voltage-responsive connector for use in the inverter according to the present invention.

The opposed electrodes 18a and 18b (refer to FIG. 7) of the voltage-responsive connector 18 are desirably formed by a highly thermal-conductive metal for favorable heat dissipation and exposed to the outside to reliably contact the insulating oil 61 with a larger heat capacity than that of the electrodes.

Even when a liquid appears to contact a metal, an extremely thin air layer may be produced between the two, which leads to blockage of heat conduction by the air. Thus, before immersion in the insulating oil 61, the voltage-responsive connector 18 may undergo surface treatment such as a hydrophilic process to increase in wettability in electrode surfaces using a surface-active agent, for example.

The insulating oil 61 is preferably higher in electric resistance by three digits or more than the inter-electrode impedance at the switching frequency to cause discharge only between the electrodes of the voltage-responsive connector 18.

The heat dissipater also includes the unit that convects the insulating oil 61. In the example, the unit is composed of an agitator 66 that rotates in the insulating oil 61 to agitate the insulating oil 61 and an agitator drive unit 67 that has a magnet portion rotating in a housing on which the container 62 is placed. The agitator 66 is magnetized in N and S poles at both ends and rotated by a magnetic force from the rotating magnet portion in the agitator drive unit 67. The insulating oil 61 is agitated and convected by the rotation of the agitator 66 to facilitate dissipation of heat from the voltage-responsive connector 18.

Such an agitation device is publicly known as described in Japanese Laid-open Patent Publication No. 2005-254073.

As an alternative unit that convects the insulating oil 61 in the container 62, the container 62 may be provided with a flow inlet and a flow outlet that are connected together with a pipe having a pump in the middle thereof, such that the pump circulates and convects the insulating oil 61 in the container 62.

The incombustible fluid for heat dissipation may be any other liquid such as water, or incombustible gas or inert gas such as nitrogen ($N_2$), carbon dioxide ($CO_2$), chlorofluorocarbon (CFC or HCFC), or hydrofluorocarbon (HFC).

When the discharger 20 as the load of the high-voltage inverter generates dielectric-barrier discharge at the atmospheric pressure, the discharge starting voltage is about 6 KV but can be further lowered by sealing the discharge electrodes and the opposed electrodes in a gas or bringing down the internal pressure.

This also lowers the voltage at which the voltage-responsive connector 18 operates, but it is necessary to facilitate heat dissipation from the voltage-responsive connector 18.

Embodiment of a Sheet Material Modification Apparatus

Next, one embodiment of the sheet material modification apparatus according to the present invention will be described with reference to FIG. 11.

Figure 11:
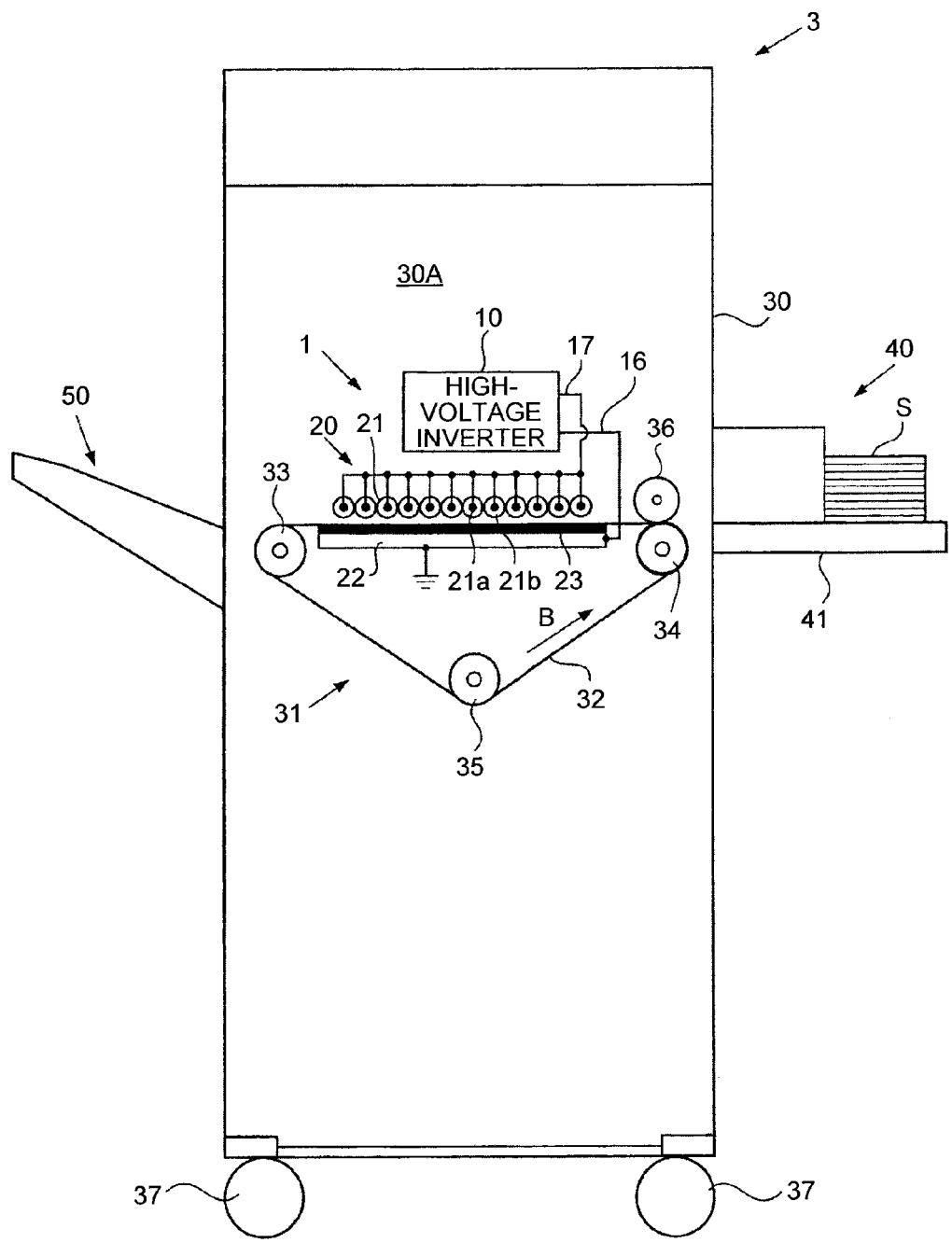
FIG. 11 is a schematic configuration diagram illustrating one embodiment of a sheet material modification apparatus according to the present invention.

FIG. 11 is a schematic configuration diagram of a stand-alone sheet material modification apparatus as one embodiment of the present invention.

The sheet material modification apparatus 3 is an apparatus that applies modification treatment to the surfaces of sheet materials such as plain paper or coated paper for general use in copying, printing, or the like, resin films including OHP sheets, thick paper such as cards and post cards, and envelops. The modification treatment allows the water-shedding surface of a sheet material to be hydrophilic.

The sheet material modification apparatus 3 illustrated in FIG. 11 includes in a main body 30, as a modification unit 30A applying the foregoing modification treatment, the foregoing dielectric-barrier discharge generation device 1 and a sheet material carrier device 31.

As described above with reference to FIGS. 1 and 6, the dielectric-barrier discharge generation device 1 is composed of the high-voltage inverter 10 (given the same reference sign as that in FIG. 1) and the discharger 20.

The discharger 20 has the plurality of discharge electrodes 21, the counter electrode 22, and the dielectric 23. The dielectric 23 is attached to the surface of the counter electrode 22 opposed to the discharge electrodes 21.

The earth-side output line 16 of the high-voltage inverter 10 is connected to the grounded counter electrode 22, and the high voltage-side output line 17 of the same is connected to metal lines 21a of the discharge electrodes 21. Accordingly, an output voltage of dozen KV from the high-voltage inverter 10 is applied to between the discharge electrodes 21 and the counter electrode 22 to generate dielectric-barrier discharge.

The sheet material carrier device 31 has a carrying belt 32 made from an insulating material such as polyimide, a driving roller 33 that extends the carrying belt 32 along an approximately horizontal surface of the dielectric 23, a driven roller 34, and a tension roller 35. The sheet material carrier device 31 also has a pinch roller 36 opposed to the driven roller 34.

The driving roller 33 is rotated and driven by a motor not illustrated to move (rotate) the carrying belt 32 around in a direction illustrated by arrow B. The carrying belt 32 has a larger width (vertical to the sheet surface of FIG. 11) than the maximum width of a sheet material to undergo modification treatment.

The discharger 20 has a plurality of (12 in the illustrated example) roller-shaped discharge electrodes 21 of the same shape aligned along the moving direction of a portion of the carrying belt 32 extended approximately horizontally between the driving roller 33 and the driven roller 34. The discharge electrodes 21 extend along the width of the carrying belt 32.

The main body 30 has on one side surface a sheet material feeding unit 40 that feeds sheet material S to the modification unit in the main body 30, and has on the other side surface a sheet material placement portion 50 on which the modified sheet material is discharged and placed. The main body 30 has also at the top portion an operation panel not illustrated that includes various operation switches, an indicator, and others.

The main body 30 has at the bottom portion casters 37 to easily move the sheet material modification apparatus 3 for use together with an image forming apparatus or the like.

According to the thus configured sheet material modification apparatus 3, when the dielectric-barrier discharge generation device 1 is started at the modification unit 30A in the main body 30, the high-voltage inverter 10 applies a high voltage to between the discharge electrodes 21 and the counter electrode 22 of the discharger 20. This generates dielectric-barrier discharge between the discharge electrodes 21 and the counter electrode 22 to form plasma toward the counter electrode 22. In this case, besides the dielectric 23, the insulators 21b of the discharge electrodes 21 and the carrying belt 32 constitute dielectric between the metal lines 21a of the discharge electrodes 21 and the counter electrode 22. Thus, in some cases, the dielectric 23 attached to the surface of the counter electrode 22 may be omitted.

Then, the sheet material feeding unit 40 feeds the sheet material S placed on a tray 41 one by one to the modification unit 30A in the main body 30. The fed sheet material S is sandwiched between the driven roller 34 and the pinch roller 36 and brought onto the carrying belt 32, and carried on the carrying belt 32 between the discharge electrodes 21 and the dielectric 23 in the leftward direction of FIG. 11.

During the carrying, the surface of the sheet material is increasingly modified in contact with the foregoing plasma generated by dielectric-barrier discharge. Specifically, the plasma forms various groups such as hydrophilic functional groups formed from components contained in the air and the sheet material, on the surface of the sheet material with increasing surface energy. Accordingly, if the surface of the sheet material has a water-shedding portion, for example, the portion is modified so as to be hydrophilic.

In the area where the sheet material S resides in the discharger 20, the plasma resulting from creeping discharge is generated along the surface of the sheet material S to effectively modify the sheet material S.

The sheet material having undergone the surface modification treatment by the modification unit 30A is fed out of the main body 30 and placed on the sheet material placement portion 50.

The large number of discharge electrodes 21 is arranged along the moving direction of the carrying belt 32, and the discharge electrodes 21 are each formed in a round bar shape in which the insulator 21b is provided around the metal line 21a. This makes it possible to prevent concentration of discharge and achieve entirely uniform modification.

When the discharge electrodes 21 are in constant contact with the surface of the sheet material by applying a pressing force to the discharge electrodes 21 such that the discharge electrodes 21 are supported so as to capable of following the movement of the sheet material or moving in the vertical direction, it is possible to further improve uniformity and suppress energy loss.

When the sheet material increased in hydrophilicity by the modification treatment as described above is used as printing sheets for an ink-jet image forming apparatus, for example, the sheet material improves image quality and shortens time of drying ink due to favorable adherability of ink droplet to eliminate the need for drying the ink by heating. The sheet material also allows rapid automatic double-sided printing.

Otherwise, when the sheet material with images formed by an electro photographic image forming apparatus is enhanced in hydrophilicity by the modification treatment, the entire sheet material can be evenly coated with varnish or the like in the after-treatment process. This makes it easier to protect the surface of the sheet material with images and apply a glossy finish to the same for additional values.

The sheet material modification apparatus according to the present invention may not be singly configured but may be incorporated into image forming apparatuses and printing devices such as printers, photocopiers, facsimiles, digital multifunctional peripherals having the foregoing functions, and commercial-use large-sized printers. The sheet material used may not be cut sheets but may be long sheets in roll form.

The inverter according to the present invention is not limited to a power source for dielectric-barrier discharge generation devices but may be used as any of power sources for various devices such as high-voltage discharge lamps, electrostatic coating devices, etching devices, thin-film forming devices, ozone generating devices, ozone water generating devices, dust collecting devices, and soap-less washing machines.

The present invention is not limited to the foregoing embodiments but may be subjected to various modifications, additions, or omissions. As a matter of the course, the embodiments can be carried out as appropriate in combination, provided that the combination does not produce any inconsistence.

The inverter according to the present invention makes it possible to prevent occurrence of oscillating transient voltages (ringing) in an output voltage as an alternating high voltage or prevent at least application of the transient voltages to the load.

Accordingly, it is possible to prevent reductions in efficiency and reliability of the inverter, reduce heat generation, suppress dispersion of electromagnetic noise, and prevent occurrence of radio disturbances at peripheral devices.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An inverter that switches an input voltage to flow an excitation current to an excitation winding of a transformer, and outputs an alternating voltage from a secondary output winding of the transformer, wherein
   in an output circuit that flows a current to a load by the alternating voltage output from the output winding of the transformer, a voltage-responsive connector is connected in series with the output winding to interrupt or connect the output circuit according to a voltage applied to between opposed electrodes by the alternating voltage, and
   the voltage-responsive connector has characteristics of keeping the electrodes in an insulated state until an instantaneous value of the alternating voltage reaches a predetermined value, and holding the electrodes in a conduction state while the instantaneous value of the alternating voltage has reached the predetermined value and continues to exceed the predetermined value, and quickly returning the electrodes to the insulated state when the instantaneous value of the alternating voltage has fallen below the predetermined value.

2. The inverter according to claim 1, wherein
   the predetermined value is of a voltage of 10% to 20% of a crest value of the alternating voltage.

3. The inverter according to claim 1, wherein,
   when the load generates dielectric-barrier discharge, the predetermined value is of a voltage for starting dielectric-barrier discharge.

4. The inverter according to claim 1, wherein
   a plurality of the voltage-responsive connectors is connected in series with the output winding so as to be in series with or in parallel to each other or in combination of serial and parallel patterns.

5. The inverter according to claim 1, wherein
   the voltage-responsive connector is an arrester.

6. The inverter according to claim 1, wherein
   a unit dissipating heat generated by the voltage-responsive connector is provided.

7. The inverter according to claim 6, wherein
   the unit dissipating heat generated by the voltage-responsive connector includes a container that immerses and stores the voltage-responsive connector in an incombustible fluid and a unit that stirs the incombustible fluid in the container.

8. The inverter according to claim 1, wherein
   the transformer is composed of a plurality of transformers having the same characteristics,
   excitation windings of the plurality of transformers are connected in parallel and excited at the same time,
   output windings of the plurality of transformers are connected in series, and
   time axes of waveforms of output voltages from the output windings are synchronized.

9. A dielectric-barrier discharge generation device, comprising: an inverter that switches an input voltage to flow an excitation current to an excitation winding of a transformer, and outputs an alternating voltage from a secondary output winding of the transformer, wherein in an output circuit that flows a current to a load by the alternating voltage output from the output winding of the transformer, a voltage-responsive connector is connected in series with the output winding to interrupt or connect the output circuit according to a voltage applied to between opposed electrodes by the alternating voltage, and the voltage-responsive connector has characteristics of keeping the electrodes in an insulated state until an instantaneous value of the alternating voltage reaches a predetermined value, and holding the electrodes in a conduction state while the instantaneous value of the alternating voltage has reached the predetermined value and continues to exceed the predetermined value, and quickly returning the electrodes to the insulated state when the instantaneous value of the alternating voltage has fallen below the predetermined value; and a discharger as a load to which the alternating voltage output from the output winding of the transformer in the inverter is applied, wherein the discharger has a discharge electrode and a counter electrode across a dielectric, the alternating voltage is applied to between the discharge electrode and the counter electrode to generate creeping discharge or silent discharge, or dielectric-barrier discharge by a composite discharge of creeping discharge and silent discharge.

10. A sheet material modification apparatus, comprising: a dielectric-barrier discharge generation device comprising an inverter that switches an input voltage to flow an excitation current to an excitation winding of a transformer, and outputs an alternating voltage from a secondary output winding of the transformer, wherein in an output circuit that flows a current to a load by the alternating voltage output from the output winding of the transformer, a voltage-responsive connector is connected in series with the output winding to interrupt or connect the output circuit according to a voltage applied to between opposed electrodes by the alternating voltage, and the voltage-responsive connector has characteristics of keeping the electrodes in an insulated state until an instantaneous value of the alternating voltage reaches a predetermined value, and holding the electrodes in a conduction state while the instantaneous value of the alternating voltage has reached the predetermined value and continues to exceed the predetermined value, and quickly returning the electrodes to the insulated state when the instantaneous value of the alternating voltage has fallen below the predetermined value; and a discharger as a load to which the alternating voltage output from the output winding of the transformer in the inverter is applied, wherein the discharger has a discharge electrode and a counter electrode across a dielectric, the alternating voltage is applied to between the discharge electrode and the counter electrode to generate creeping discharge or silent discharge, or dielectric-barrier discharge by a composite discharge of creeping discharge and silent discharge; wherein a sheet material is carried between the discharge electrode and the dielectric in the dielectric-barrier discharge generation device to modify the sheet material by the dielectric-barrier discharge.

* * * * *